United States Patent [19]
Etzold et al.

[11] Patent Number: 5,127,614
[45] Date of Patent: Jul. 7, 1992

[54] MICROSCOPE STAND

[75] Inventors: Christfried Etzold; Dieter Schau; Peter Kuehn, all of Jena, German Democratic Rep.

[73] Assignee: Jenoptik Jena G.m.b.H., Jena, German Democratic Rep.

[21] Appl. No.: 505,311

[22] Filed: Apr. 5, 1990

[30] Foreign Application Priority Data

Jun. 6, 1989 [DD] German Democratic Rep. .................................. 3292806

[51] Int. Cl.⁵ ............................................ F16M 11/00
[52] U.S. Cl. ..................................... 248/127; 248/615
[58] Field of Search .............. 248/127, 121, 615, 124, 248/125, 677; 350/507, 518, 521, 529, 532

[56] References Cited

U.S. PATENT DOCUMENTS

| | | | |
|---|---|---|---|
| 910,066 | 1/1909 | Jackson | 248/125 X |
| 1,290,159 | 1/1919 | Foster | 248/615 |
| 1,826,820 | 10/1931 | Perkins et al. | 248/615 X |
| 1,893,567 | 1/1933 | Solomita | 248/127 X |
| 2,177,399 | 10/1939 | Aller | 248/125 |
| 2,421,500 | 6/1947 | Haff | 350/521 X |
| 2,560,884 | 7/1951 | Nagourney | 248/124 |
| 2,597,244 | 5/1952 | Hussman | 248/615 |
| 2,690,948 | 10/1954 | Seyter et al. | 248/615 X |

FOREIGN PATENT DOCUMENTS

| | | | |
|---|---|---|---|
| 669164 | 12/1939 | Fed. Rep. of Germany | 350/521 |
| 2921890 | 12/1980 | Fed. Rep. of Germany | 248/124 |
| 169249 | 9/1921 | United Kingdom | 350/521 |

*Primary Examiner*—Alvin C. Chin-Shue
*Attorney, Agent, or Firm*—Jordan and Hamburg

[57] ABSTRACT

Microscope stand for microscopes of conventional open construction, in which the throat facing the observer can also face away from him, especially for light microscopes which are constructed on the modular principle and are used as educational, general-purpose or research microscopes. A great level of insensitivity to vibration is achieved in accordance with the invention in a microscope stand, consisting of a base, a column, a tube holder and feet, by the fact that the column is made to rest on the surface on which the microscope is placed.

5 Claims, 1 Drawing Sheet

MICROSCOPE STAND

BACKGROUND OF THE INVENTION

The invention is applicable to microscope stands of conventional open construction, in which the throat facing the observer can also face away from the observer, for educational general-purpose or research microscopes, especially for light microscopes which are constructed on the modular principle.

Light microscopes of conventional construction are technical apparatuses, which are set up without much ado at any place in a room or building. Optical systems of high resolution with large fields of view and very great magnification are also used in such microscopes. The microscope is also used as a measuring instrument of great precision. In normal applications, floor and building vibrations act as external interference causing the microscope to vibrate. These vibrations occur at frequencies mainly between 0 and 25 Hz.

To enable these interfering vibrations to pass between the objective and the object as relative amplitudes of greatly attenuated form, it is known to design the stand as a solid body of great mass (DE-GM 77 12 438) or as a closed stand (U.S. Pat. No. 3,260,157). These designs have the disadvantage that they greatly add to the mass, and they make changeovers between various viewing methods and accessory units difficult, or manipulation on the object stage is negatively affected.

These designs are not suitable for use in easily transportable general-purpose microscopes. It is also known that vibration isolation measures are unsuitable for technical table microscopes of low mass, since trouble areas and undefined resonances occur due to vibration insulation that is not tuned sufficiently low (DD-WP 21 37 66).

Stand designs are furthermore known which influence the vibration performance through a special configuration of the tube and objective supporting arms (DE-OS 29 02 962), by a rigid joining together of the ocular and object holders (U.S. Pat. No. 3,260,157) or by the use of coupling points of defined rigidity or rigid clamping between the components of the stand (DD-WP 23 32 12).

These designs have been created for massive microscopes with a plurality of accessory units some of which add to the mass, and which call for great complexity of construction and depart from the idea of light-weight construction and portability in a table microscope. All of the above-mentioned known stands are so constructed that the column of the stand is disposed on a base, and the rigidity of the junction has an especially great influence on the relative movements between objective and object on account of the great level arm between the object and the objective, and in the known technical proposals an undesirable dynamic effect is produced by resiliency in the column, in the base and in the junction between them.

It is the aim of the invention to create a microscope stand in which external mechanical vibrations, especially building vibrations, will have a minimal disturbing effect on the quality of the image in the optical microscope system, while at the same time the simple, light-weight, open stand design will be retained.

It is the object of the invention to create a microscope stand of conventional open construction on the principle of light-weight design, which will be designed such that external mechanical vibrations, especially building vibrations, will have a minimal disturbing effect on the quality of the image in the optical microscope system, and such that the modular principle will be retained without additional technical cost.

SUMMARY OF THE INVENTION

The object is achieved in accordance with the invention, in a microscope stand consisting of a base, a column, an arm and feet, in that the column is fastened to one of the four narrow sides of the base, and the column can rest, on a foot with which it is provided, on a planar surface.

Advantageous variants in accordance with the invention consist in the fact that the foot is a component of the column or the foot is fastened to the bottom surface of the column as well as in the fact that the foot associated with the column, as well as additional two feet provided on the base, are themselves damping means, or in that damping means are provided between the feet and the points at which they are fastened.

It is also advantageous that the narrow end of the base to which the column is fastened has a recess which preferably reaches partially around the column. In this case the column can be fastened by interlocking or by clamping to the base at one or more points or areas of contact.

The invention operates because of the fact that the column, and with it all of the units fastened to it, is no longer set in vibration, and vibrations are not transmitted to it, by soft supporting structures and connecting means such as have formerly been commonly used. It is brought about that, while retaining light-weight construction, the lowest natural frequency of the microscope stand is substantially above the external undesirable influences. The result is an improved usefulness which expresses itself in a decidedly greater stability of the objective image.

The invention will be further explained below with the aid of an embodiment represented diagrammatically in the drawing.

BRIEF DESCRIPTION OF THE DRAWINGS

In FIGS. 1 and 2 a microscope stand S is represented. The column 1 and the arm 2 are advantageously castings. The focusing guide 9 with the stage holder 3 is fastened to the column 1. The base 4 reaches laterally around the column 1 and is rigidly joined to it at its front contact surface by joining means 5 which are not shown. Under the column 1 and at the two front corners of the stand 4 the feet 6a and 6b are disposed. The base 4 is covered on the bottom by a cover plate 7. The body tube 10 with the binocular tube 11 and the objective turret 12 with objective 13 are fastened to the arm 2. The object stage 14 is disposed on the stage holder 3. The feet 6a and 6b are preferably plastic pieces with low slipping properties but high mechanical damping properties, i.e., the feet are preferably damping means, or damping means are provided between the feet and the points at which they are fastened, which minimizes the relatively great elongations in the natural frequency range of the microscope. On account of the direct connection between column 1 and the table top 8, undesirable resilient elements, which are present in the form of hollow supporting structures and connecting means in conventional design, are completely eliminated. The recess 4a in the base 4, which reaches around the column 1, supports the column 1 and minimizes the elongations of the column 1 occurring due to excitation. This effect leads to a greatly reduced relative movement between the microscope objective 13 and the object stage 14.

Figure 1:
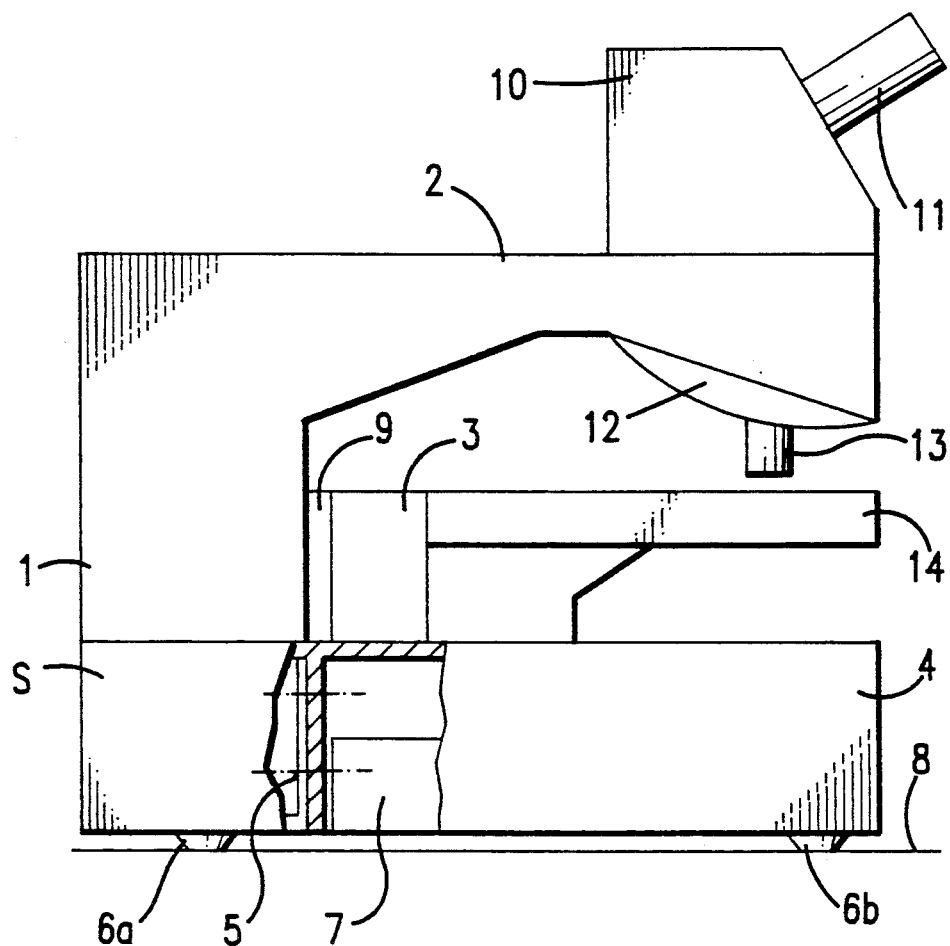
FIG. 1 is a side elevation view of an embodiment having an open base.
Figure 2:
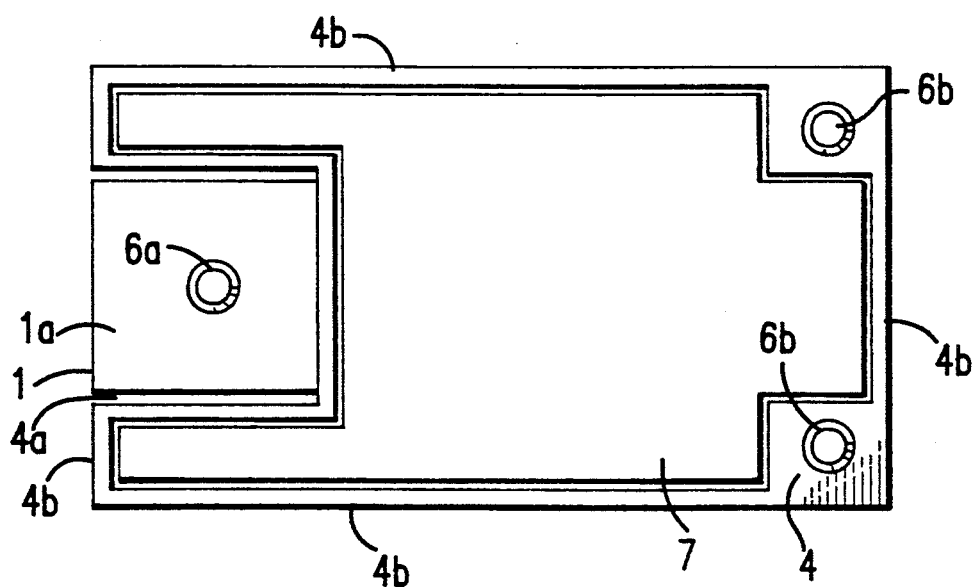
FIG. 2 is a bottom plan view of the embodiment of FIG. 1.

We claim:

1. A stand for a light-weight, portable microscope adapted to rest on a horizontal planar surface, comprising a base formed of relatively thin, substantially vertical side walls joined at lateral margins thereof to enclose a free space, a substantially vertical column arranged outside of said free space, a substantially horizontal arm cantilevered from the column, means for holding a microscope tube, said microscope tube holding means being supported by the arm at a free extremity of the arm, the column being fastened to the base only at an external surface of one of said side walls, and a damping foot located at a lower extremity of the column for directly supporting the column on said planar surface, in which the side wall of the base to which the column is fastened is at a rear of the base opposite to a side wall of the base which is at a front of the base facing a user of the microscope, and lateral side walls of the base connect said side wall to which the column is fastened and said side wall which faces a user.

2. A microscope stand according to claim 1, in which the damping foot is integrally formed with the column.

3. A microscope stand according to claim 1, in which the lower extremity of the column has a substantially horizontal surface and the damping foot is located at said surface of the column.

4. A microscope stand according to claim 1, in which junctures of said lateral side walls and said side wall which faces the user are of greater thickness than other portions of said side walls and respective second and third damping feet are located at said junctures for supporting the base on the horizontal planar surface.

5. A microscope stand according to claim 1, in which a recess at least partially receiving the column is formed in said wall of the base to which the column is fastened.

* * * * *